(12) United States Patent
Ogawa (10) Patent No.: US 9,447,284 B2
(45) Date of Patent: Sep. 20, 2016

(54) WATER REPELLENT GLASS PLATES

(75) Inventor: Kazufumi Ogawa, Awa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1174 days.

(21) Appl. No.: 12/598,288

(22) PCT Filed: May 1, 2007

(86) PCT No.: PCT/JP2007/059788
§ 371 (c)(1),
(2), (4) Date: Oct. 30, 2009

(87) PCT Pub. No.: WO2008/139598
PCT Pub. Date: Nov. 20, 2008

(65) Prior Publication Data
US 2010/0330373 A1    Dec. 30, 2010

(51) Int. Cl.
| | | |
|---|---|---|
| B32B 17/10 | (2006.01) | |
| C09D 1/00 | (2006.01) | |
| C03C 17/34 | (2006.01) | |

(52) U.S. Cl.
CPC ............ *C09D 1/00* (2013.01); *C03C 17/3405* (2013.01); *C03C 2217/42* (2013.01); *C03C 2217/76* (2013.01); *Y10T 428/31525* (2015.04)

(58) Field of Classification Search
None
See application file for complete search history.

(56) References Cited

U.S. PATENT DOCUMENTS

| | | | |
|---|---|---|---|
| 2,643,020 A | 6/1953 | Dalton | |
| 4,210,687 A | 7/1980 | Obendorf et al. | |
| 4,467,068 A * | 8/1984 | Maruyama et al. | .......... 524/731 |
| 5,266,358 A | 11/1993 | Uemura et al. | |
| 5,324,566 A | 6/1994 | Ogawa et al. | |
| 5,437,894 A * | 8/1995 | Ogawa et al. | ................ 427/535 |
| 5,608,003 A * | 3/1997 | Zhu | .............................. 524/516 |
| 6,338,905 B1* | 1/2002 | Akamatsu et al. | .......... 428/428 |
| 2002/0160166 A1 | 10/2002 | Hattori | |
| 2006/0154048 A1 | 7/2006 | Teranishi et al. | |
| 2006/0216476 A1 | 9/2006 | Ganti et al. | |
| 2006/0263516 A1* | 11/2006 | Jones et al. | ................... 427/180 |
| 2009/0046379 A1 | 2/2009 | Kuramoto et al. | |
| 2009/0046397 A1 | 2/2009 | Sun et al. | |
| 2009/0068453 A1 | 3/2009 | Chung | |
| 2010/0119774 A1 | 5/2010 | Ogawa | |
| 2011/0232330 A1 | 9/2011 | Noni, Jr. | |

FOREIGN PATENT DOCUMENTS

| | | | |
|---|---|---|---|
| JP | 01126244 | 5/1989 | |
| JP | 4132367 | 5/1992 | |
| JP | 4132637 | 5/1992 | |
| JP | 04239633 | 8/1992 | |
| JP | 06340451 A * | 12/1994 | ............. C03C 17/42 |

(Continued)

OTHER PUBLICATIONS

JP 06340451 A English Machine Translation retrieved from JPO (1994).*

(Continued)

*Primary Examiner* — Kenneth Stachel
(74) *Attorney, Agent, or Firm* — Workman Nydegger (57) ABSTRACT

A water repellent glass plate, manufacturing method thereof, and a vehicle or a paned window having the same can include a glass plate having a film coating that includes a transparent micro particle covalently bound to the surface of the glass.

19 Claims, 4 Drawing Sheets

WHEREIN ⟝⟞ DESIGNATES
$$CF_3(CF_2)_7(CH_2)_2 Si \begin{array}{c} -NH- \\ -NH- \\ -NH- \end{array}, \text{AND}$$
WHEREIN ● DESIGNATES BONDING OF —Si—NH—

(56) References Cited

FOREIGN PATENT DOCUMENTS

| JP | 07-090691 | 4/1995 | | |
| JP | 07300346 | 11/1995 | | |
| JP | 08157643 A | * 6/1996 | ............... | C08K 9/04 |
| JP | 2001/180981 | 7/2001 | | |
| JP | 2003-145042 | 5/2003 | | |
| JP | 2005/169761 | 6/2005 | | |
| JP | 2005-206790 | 8/2005 | | |
| JP | 2006-224234 | 8/2006 | | |
| JP | 2007/126332 | 5/2007 | | |
| JP | 2007/333291 | 12/2007 | | |
| JP | 2008/007363 | 1/2008 | | |
| JP | 2008/007365 | 1/2008 | | |
| WO | 2004/052640 | 6/2004 | | |
| WO | 2006/121102 | 11/2006 | | |
| WO | 2008/120783 | 10/2008 | | |

OTHER PUBLICATIONS

Endurable Water-repellent Glass for Automobiles, Hong, Thin Solid Films 351pp. 274-278 (1999).*

English machine translation of JP 08157643 from IPDL of JPO (1996).*

Sung, L-P., et al., "Scratch behavior of nano-alumina/polyurethane coatings," Journal of Coatings Technology and Research, vol. 5, No. 4, FSCT and OCCA, pp: 419-430 (2008).

Wikipedia., "Self-assembled monolayer," accessed at http://en.wikipedia.org/wiki/Self_assembled_monolayer, last modified on Jan. 26, 2012, pp. 9.

Yeo, L., Wetting and Spreading. In *Encyclopedia of Microfluidics and Nanofluidics* (ed. D Li), pp. 2186-2196 (Springer, New York, 2008).

International Search Report for International Application No. PCT/JP2007/059788, mailed on Aug. 21, 2007.

"Epoxy Siloxane Resins," accessed at http://www.polyset.com/Products/Advanced-Materials/Epoxy-Siloxane-Resins.htm, accessed on Mar. 12, 2013, p. 1.

International Search Report and Written Opinion for International Application No. PCT/JP2007/074469, mailed Apr. 8, 2008.

International Search Report and Written Opinion for International Application No. PCT/JP2008/056373, mailed May 13, 2008.

Perkins, S., "Blueprint to repel oil and water," Science News, vol. 174, No. 12, accessed on https://web.archive.org/web/20081220082847/http://www.sciencenews.org/view/generic/id/38466/title/Blueprint_to_repel_oil_and_water, Dec. 6, 2008, pp. 2.

* cited by examiner

WHEREIN ◯ DESIGNATES BONDING OF — $(CH_2)CHCH_2$ — $NHCH_2$ —
$\qquad\qquad\qquad\qquad\qquad\qquad\qquad\qquad\qquad\quad |$
$\qquad\qquad\qquad\qquad\qquad\qquad\qquad\qquad\qquad\ \ OH$

FIGURE 3B

WHEREIN ◁ DESIGNATES
$\qquad\qquad\qquad\quad NH-$
$\qquad\qquad\qquad\quad\ |$
$CF_3(CF_2)_7(CH_2)_2 Si - NH -$ , AND
$\qquad\qquad\qquad\quad\ |$
$\qquad\qquad\qquad\quad NH-$ WHEREIN ● DESIGNATES BONDING OF — Si — NH —

FIGURE 4

WATER REPELLENT GLASS PLATES

CROSS-REFERENCE TO RELATED APPLICATION

The present application is a U.S. national stage filing under 35 U.S.C. §371 of International Application No. PCT/JP2007/05978, filed on May 1, 2007.

TECHNICAL FIELD

A glass plate with a high enduring and water repellent coating film on the surface of the glass plate is described. The glass plate can be used for windows in vehicles, automobiles or buildings to provide water repellency, oil repellency, and antifouling properties.

BACKGROUND

Generally, it is understood that a monomolecular film that is water repellent can be prepared by chemical absorption onto a surface. Such a film can be produced using a chemical absorption composition having a chlorosilane absorbent containing a fluorocarbon group and a nonaqueous organic solvent, and then carrying out a chemical absorption in liquid phase (Unexamined Patent Publication (Kokai) No. 1990-258032).

The water repellent film can be formed by the de-hydrochloric reaction between an active hydrogen on the surface, such as the hydroxyl group on the surface of the base material, and the chlorosilyl group of the chlorosilane absorbent. However, the resulting films have problems for poor friction resistances or water repellencies.

SUMMARY

Accordingly, it would be advantageous to provide a water repellent glass plate which can improve the durability for friction resistance, weather resistance, water droplet repellency (water slipping property), and antifouling property or soil resistance for a glass plate window used in automobiles and buildings. As such, a glass plate can be coated with a film to provide water repellency, oil repellency, antifouling property, and soil resistance.

An innovative water repellent glass plate can have high durability and water droplet repellency (water slipping property) such that water beads and slips from the glass surface without sticking. The glass surface can be covered with a covalently bound water repellent transparent micro particle film. A film can be prepared on the surface of the plate by a manufacturing process as described herein.

A reactive glass plate having an epoxy group or an imino group can be manufactured by contacting a glass plate with a chemical absorption liquid composition that is prepared by mixing an alkoxysilane compound having an epoxy group or an imino group, a silanol condensation catalyst, and a nonaqueous organic solvent, and then reacting a surface of the glass plate with the alkoxysilane compound having an epoxy group or an imino group.

A reactive transparent micro particle having an imino group or an epoxy group can be prepared by dispersing a transparent micro particle into a chemical absorption liquid composition prepared by mixing an alkoxysilane compound having an imino group or an epoxy group, a silanol condensation catalyst, and a nonaqueous organic solvent, and then reacting a surface of the transparent micro particle with the alkoxysilane compound having an imino group or an epoxy group.

The reactive glass plate can be linked to the reactive transparent micro particle by contacting the reactive glass plate having an epoxy group with the reactive transparent micro particle having an imino group, or contacting the reactive glass plate having an imino group with the reactive transparent micro particle having an epoxy group. The glass and particle are then heated together.

A water repellent coating film can be formed on the glass plate which has the transparent micro particle bound to its surface by contacting a chemical absorption liquid composition to the glass plate and micro particle. The chemical absorption liquid composition can be prepared by mixing a chlorosilane compound having a fluorocarbon group and a trichlorosilyl group with a nonaqueous organic solvent or by mixing an alkoxysilane compound having a fluorocarbon group and an alkoxylsilyl group with a silanol condensation catalyst and a nonaqueous organic solvent.

The glass plate having high durability and water droplet repellency can be used as a paned window for a vehicle such as an automobile or a building, wherein the surface of the glass plate is covered with a repellent micro particle film. The water contacting degree of the glass plate can be greater than 150 degrees.

As described in further detail herein, the disclosed water repellent glass plate provides a paned window which can be used in fields where functions for water repellency, oil repellency and antifouling or soil resistance is desired. Also, the water repellant glass can have high durability for friction resistance, weather resistance, water droplet repellency (water slipping property) and antifouling or soil resistance properties.

BRIEF DESCRIPTION OF THE FIGURES

FIG. 1A shows the surface of the glass plate before reaction process, and FIG. 1B shows the surface after forming of the monomolecular film containing an epoxy group.

FIGS. 2A-2B are conceptual diagrams that illustrate a process for forming the monomolecular film containing an amino group on the surface of the alumina micro particle in example 1. FIG. 2A shows the surface of the glass plate before reaction process, and FIG. 2B shows the surface after forming of the monomolecular film containing an amino group.

FIGS. 3A-3B are conceptual diagrams that illustrate a process for binding the alumina micro particle to the surface of the glass plate and further forming the water repellent monomolecular film on the surface of the alumina micro particle in example 1. FIG. 3A shows the surface after the alumina micro particle has been bound to the surface of the glass plate, and FIG. 3B shows the surface after the water repellent monomolecular film has been formed on the surface through the intermediary of an amino group.

DETAILED DESCRIPTION

Embodiments of a water repellent glass plate, manufacturing method thereof, and a vehicle or a paned window using the same are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

A water repellent glass plate that is covered with a covalently bound water repellent transparent micro particle on the surface of the plate. The water repellant glass plate can be prepared by: preparing a reactive glass plate; preparing a reactive transparent micro particle; and binding the transparent micro particle to the glass plate to form a water repellant film.

A reactive glass plate having an epoxy group or an imino group can be prepared by bringing a glass plate in contact with a chemical absorption liquid composition that is prepared by mixing an alkoxysilane compound having an epoxy group or an imino group, a silanol condensation catalyst, and a nonaqueous organic solvent, and then reacting a surface of the glass plate with the alkoxysilane compound having an epoxy group or an imino group.

A reactive transparent micro particle having an imino group or an epoxy group can be prepared by dispersing a transparent micro particle in a chemical absorption liquid composition that is prepared by mixing an alkoxysilane compound having an imino group or an epoxy group, a silanol condensation catalyst, and a nonaqueous organic solvent, and then reacting a surface of the transparent micro particle with the alkoxysilane compound having an imino group or an epoxy group.

The reactive glass plate can be bound to the reactive transparent micro particle by bringing the reactive glass plate having an epoxy group in contact with the reactive transparent micro particle having an imino group; or bringing the reactive glass plate having an imino group in contact with the reactive transparent micro particle having an epoxy group, and heating the glass plate and micro particle.

A water repellent coating film can be formed on the glass plate which has a transparent micro particle bound to its surface by contacting a chemical absorption liquid composition prepared by mixing a chlorosilane compound having a fluorocarbon group and a trichlorosilyl group with a nonaqueous organic solvent or by mixing an alkoxysilane compound having a fluorocarbon group and an alkoxysilyl group with a silanol condensation catalyst and a nonaqueous organic solvent, with a glass plate which has a transparent micro particle bound to its surface.

A water repellent glass plate having a transparent micro particle film can be used as a paned window for an automobile or a building. The water repellent glass place can provide water repellency, oil repellency, and soil resistance. The water repellent glass plate can be useful for providing good driving visibility in occasions of rainy weather, and can also have a similar effect on building.

Details of various embodiments of the water repellent glass plate are described below with the use of examples, but are not restricted by these examples.

Example 1

First, a glass plate 1 (FIGS. 1A-1B) for a paned window on an automobile was prepared, and then it was washed well and dried. Then, 99 weight percent of a chemical absorbent having a reactive group (e.g., epoxy group) in a functional portion at one of its ends and an alkoxylsilyl group at the other of its ends, as shown in a chemical structure below (chemical 1), and 1 weight percent of a silanol condensation catalyst (e.g., dibutylstannum diacetylacetonate) were weighed. Both reagents were dissolved in a silicone solvent (e.g., hexamethyldisiloxane solvent) to obtain the chemical absorbent liquid with a total concentration of 1 weight percent (the concentration of the chemical absorbent can be 0.5 to 3%).

Figure 1A:
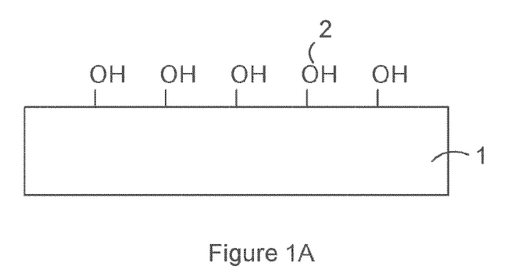
FIGS. 1A-1B are conceptual diagrams that illustrate a process for forming the monomolecular film containing an epoxy group on the surface of the glass plate in example 1.
Figure 1B:
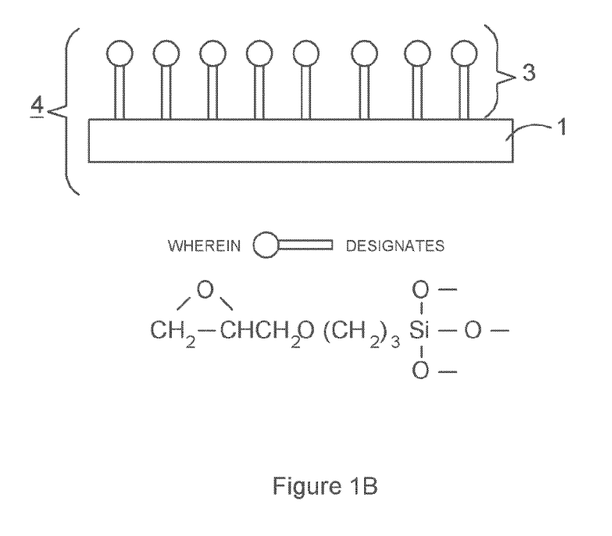

(chemical 1)

The chemical absorbent liquid composition was applied to the surface of the glass plate 1, and then the reaction was carried out for about two hours in the atmospheric air (45% relative humidity). A number of hydroxyl groups 2 are included on the surface of the glass plate 1 (FIG. 1A), and the —Si(OCH$_3$) groups in the chemical absorbent composition and the hydroxyl groups 2 undergo a dealcoholization reaction (in this case, —CH$_3$OH is removed) in the presence of the silanol condensation catalyst to form the bonding shown in the chemical structure below (chemical 2). This forms a chemical absorbent monomolecular film 3 containing epoxy groups covalently bound over the surface of the glass plate with a film thickness of about 1 nanometer as shown in FIG. 1B.

The glass surface is washed with a chloric organic solvent, such as chloroform, and the surface of glass plate 4 is covered with a chemical absorbent monomolecular film having an epoxy group on its surface (FIG. 1B).

(chemical 2)

When the plate is left in the atmospheric air without washing, the solvent is evaporated and the chemical absorbent remaining on the surface of the glass plate reacts with the moisture in the air. An ultra thin polymeric coating film of the chemical absorbent is formed on the surface of the particle. In addition, the glass plate with this coating film had a similar reactivity.

Also, an alumina micro particle 5 (FIGS. 2A-2B) having an average diameter of about 100 nm, which is smaller than visible light wavelength was prepared and dried. The size of the transparent micro particle may be smaller than visible light wavelength. Then, a chemical absorbent liquid with a total concentration of 1 weight percent (the concentration of the chemical absorbent is 0.5 to 3%) was prepared by weighing 99 weight percent of a chemical absorbent having an amino or imino group (—NH), which can react with an epoxy group is included at one end of the reagent and an alkoxysilyl group at the other of its ends as shown in a chemical structure below (chemical 3) having an amino group at one of its ends; and weighing 1 weight percent of an organic acid (e.g., acetic acid) which can be used as a silanol condensation catalyst; and then dissolving both reagents in a mixed solvent of equal parts of silicone and dimethylformamide (e.g., 50% of hexamethyldisiloxane solvent and 50% of dimethylformamide solvent).

Figure 2A:
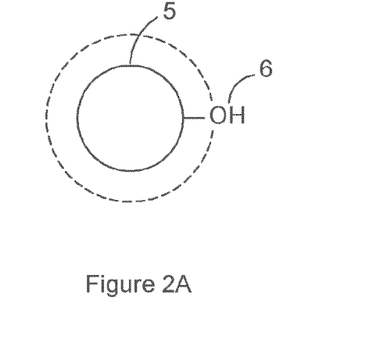
Figure 2B:
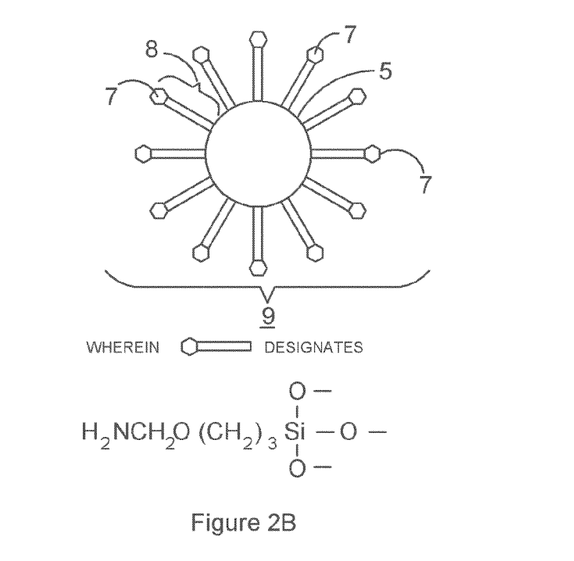

(chemical 3)

The anhydrous alumina micro particle was mixed with the chemical absorbent liquid while stirring, and then reacted in atmospheric air (45% relative humidity) for about two hours. A number of hydroxyl groups 6 are included on the surface of the alumina micro particle (FIG. 2A), and the —Si(OCH$_3$) groups in the chemical absorbent and the hydroxyl groups undergo a dealcoholization reaction (in this case, —CH$_3$OH is removed) in the presence of the acetic acid to form the bondings shown in the chemical structure below (chemical 4). A chemical absorbent monomolecular film 8 is formed containing amino groups 7 chemically bound over the surface of the micro particle with a film thickness of about 1 nanometer.

The micro particle is washed with a chloric organic solvent, such as chloroform or n-methylpyrrolidinone, under stirring. An alumina micro particle 9 with the surface covered with a chemical absorbent monomolecular film having a reactive group such as an amino group on its surface was produced (FIG. 2B) in the same way as Example 1. When using a chemical absorbent composition containing an amino group, a tin series catalyst can produce a sediment. An organic acid, such as acetic acid, can provide better results. In addition, while an amino group includes an imino group, a pyrrole derivative or an imidazole derivative could be used as a compound including an imino group or an amino group. Furthermore, when a ketimine derivative was used, an amino group was more easily introduced by hydrolysis after the coating film formation.

(chemical 4)

In addition, a monomolecular film formed with this process, as is the case with example 1, did not affect the particle diameter nor the surface shape of an alumina micro particle because the film was extremely thin with nanometer-level film thickness. When the monomolecular film was left in atmospheric air without washing, the solvent was evaporated and the chemical absorbent remaining on the surface of the particle reacted with the moisture in the air, then an alumina micro particle with an ultra thin polymeric coating film on its surface composed of the said chemical absorbent was obtained. However, it had almost the same reactivity.

Next, an ethanol dispersion of the alumina micro particle covered with the chemical absorbent monomolecular film containing the amino group was applied on the surface of the glass plate covered with a chemical absorbent monomolecular film containing said epoxy group. The ethanol was evaporated and heated with about 100 degrees for about 30 minutes. The epoxy group and the amino group underwent an addition reaction as shown in the chemical formula below (chemical 5), and the glass and the alumina particle were bound and fixed through the linking of the two monomolecular films.

Figure 3A:
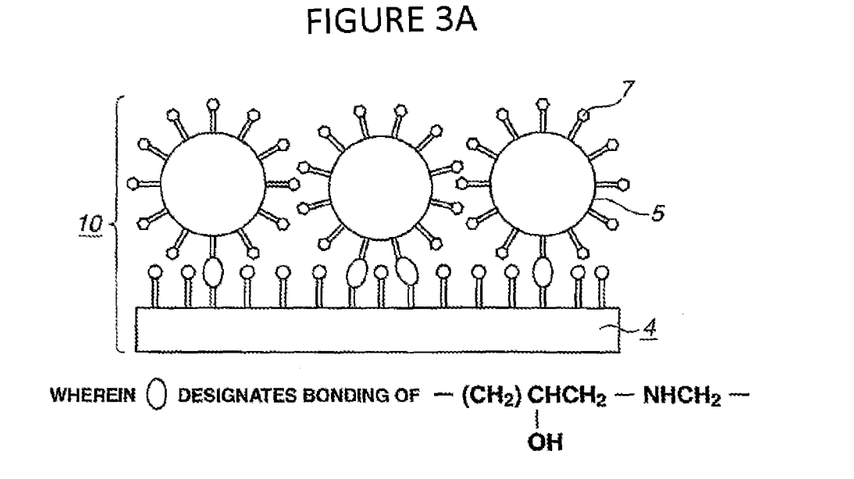

Furthermore, when washed with the organic solvent, such as chloroform, the excess alumina particles covered with a chemical absorbent monomolecular film containing unreacted amino group was eliminated. Then a glass plate 10, where only one layer of the alumina micro particle 5 was covalently bound on the surface of the glass plate 1 through the intermediary of the two monomolecular films, was produced (FIG. 3A).

(chemical 5)

Next, a chemical absorbent which can have a critical surface energy of 10 mN/m or less when forming a monomolecular film. A chemical absorbent can include a fluorocarbon group (functional portion) and a chlorosilyl group (active portion), such as CF$_3$(CF$_2$)$_7$(CH$_2$)$_2$SiCl$_3$. The chemical absorbent was dissolved in nonaqueous organic solvent (such as dehydrated nonane) to prepare the chemical absorbent. When the chemical absorbent liquid was applied on the surface of the glass plate and the reaction was carried out under a dried air atmosphere (a relative humidity of 30% or less was preferable), the dehydrochloric reaction occurred between the chlorosilyl group (SiCl) of the chemical absorbent and the amino group (—NH$_2$) on the surface of the alumina micro particle. The alumina micro particle 5 on the surface of the glass plate 4 was covered with a number of amino groups 7 (FIG. 3A), and then bonds shown in a chemical formula below (chemical 6) were produced over the surface of the alumina micro particle. Next, when washed with a chlorofluorocarbon series solvent, a glass plate 12 covered with a water repellent monomolecular film 11 of the chemical absorbent was produced.

(chemical 6)

When the plate is left in the atmospheric air without washing, the solvent is evaporated and the chemical absorbent remaining on the surface of the glass plate reacted with the moisture in the air to form an ultra thin polymeric coating film of the chemical absorbent. In addition, the glass plate with this coating film had a similar reactivity.

Since the thickness of the monomolecular film was about 1 nm at most, a convexo concave of about 50 nm on the surface of the glass plate of the alumina micro particle was not affected significantly. In addition, because of the effect of the convexo concave, the apparent water-droplet contacting degree of the glass plate was about 160 degrees, and super water repellency was realized.

In addition, the critical surface energy of the monomolecular film of CF$_3$(CF$_2$)(CH$_7$)$_2$SiCl$_3$ formed on the base material with a flat surface was about 6 mN/m, and the maximum water-droplet contacting degree was about 115 degrees.

Since the alumina micro particle has higher hardness than the glass and it is covalently bound to the surface of the glass plate, the friction resistance was improved notably compared to the monomolecular film of $CF_3(CF_2)(CH_7)_2SiCl_3$ directly formed on the surface of the glass plate.

Furthermore, since the thickness of the produced coating film was about 100 nm total, the transparency of the glass plate having the micro particle coating was not decreased or damaged.

Example 2

After preparing a glass plate having only one layer of the alumina particle film covalently bound to its surface as described in example 1, a chemical absorbent liquid with a concentration of about 1 weight percent (the chemical absorbent concentration was 0.5 to 3%) was prepared by weighing 99 weight percent of a reagent having a fluorocarbon group ($-CF_3$) at an end of the reagent and an alkoxysilyl group at the other end, such as $CF_3(CF_2)_7(CH_2)_2Si(OCH_3)_3$ being the reagent, and 1 weight percent of dibutylstannum diacetylacetonate as a silanol condensation catalyst; and then dissolving them in a silicone solvent, such as a hexamethyldisiloxane solvent. Then the glass plate, wherein only one layer of the alumina micro particle was covalently bound to the surface, was soaked in the chemical absorbent liquid and the reaction was carried out for about two hours; then the plate was washed to eliminate the excess chemical absorbent; and then the alkoxysilyl group undergoes a dealcoholization reaction with the amino group to obtain the water repellent glass.

Example 3

In contrast to example 1, by forming a chemical absorbent monomolecular film containing an amino group on the surface of the glass plate with the same method, then forming a chemical absorbent monomolecular film containing an epoxy group on the surface of the alumina micro particle, then fixing one layer of an alumina micro particle on the surface of the glass plate with the same method, and finally, reacting the $CF_3(CF_2)_7(CH_2)_2SiCl_3$ chemical absorbent, a water repellent glass was produced. This reaction allows the SiCl group to react with the epoxy group.

In above examples 1 to 3, the compounds shown in (chemical 1) and (chemical 3) were used as chemical absorbents having reactive groups and alkoxysilyl group at opposing ends. Also, the compounds shown below (1) to (16) could be used as chemical absorbents with or instead of the above compounds.

$(CH_2OCH)CH_2O(CH_2)_7Si(OCH_3)_3$     (1)

$(CH_2OCH)CH_2O(CH_2)_{11}Si(OCH_3)_3$     (2)

$(CH_2CHOCH(CH_2)_2)CH(CH_2)_2Si(OCH_3)_3$     (3)

$(CH_2CHOCH(CH_2)_2)CH(CH_2)_4Si(OCH_3)_3$     (4)

$(CH_2CHOCH(CH_2)_2)CH(CH_2)_6Si(OCH_3)_3$     (5)

$(CH_2OCH)CH_2O(CH_2)_7Si(OC_2H_5)_3$     (6)

$(CH_2OCH)CH_2O(CH_2)_{11}Si(OC_2H_5)_3$     (7)

$(CH_2CHOCH(CH_2)_2)CH(CH_2)_2Si(OC_2H_5)_3$     (8)

$(CH_2CHOCH(CH_2)_2)CH(CH_2)_4Si(OC_2H_5)_3$     (9)

$(CH_2CHOCH(CH_2)_2)CH(CH_2)_6Si(OC_2H_5)_3$     (11)

$H_2N(CH_2)_5Si(OCH_3)_3$     (12)

$H_2N(CH_2)_7Si(OCH_3)_3$     (12)

$H_2N(CH_2)_9Si(OCH_3)_3$     (13)

$H_2N(CH_2)_5Si(OC_2H_5)_3$     (14)

$H_2N(CH_2)_7Si(OC_2H_5)_3$     (15)

$H_2N(CH_2)_9Si(OC_2H_5)_3$     (16)

Here, the $(CH_2OCH)$-group represents a functional group shown in a chemical structure below (chemical 7), the $(CH_2CHOCH(CH_2)_2)CH$-group represents a functional group shown in a chemical structure below (chemical 8).

(chemical 7)

(chemical 8)

Further, in above examples 1 and 3, $CF_3(CF_2)_7(CH_2)_2SiCl_3$ was used as a fluorocarbon series chemical absorbent, however, the compounds shown below (21) to (26) could also be used with or instead of the above compounds.

$CF_3CH_2O(CH_2)_{15}SiCl_3$     (21)

$OF_3(OH_2)_3Si(OH_3)_2(OH_3)_{15}SiCl_3$     (22)

$CF_3(CF_2)_5(CH_2)_2Si(CH_3)_2(CH_2)_9SiCl_3$     (23)

$CF_3(CF_2)_7(CH_2)_2Si(CH_3)_2(CH_2)_9SiCl_3$     (24)

$CF_3COO(CH_2)_{15}SiCl_3$     (25)

$CF_3(CF_2)_5(CH_2)_2SiCl_3$     (26)

Further, in above example 2, $CF_3(CF_2)_7(CH_2)_2Si(OCH_3)_3$ was used as a fluorocarbon series chemical absorbent, however, the compounds shown below (31) to (42) could also be used with or instead of the above compounds.

$CF_3CH_2O(CH_2)_{15}Si(OCH_3)_3$     (31)

$CF_3(CH_2)_3Si(CH_3)_2(CH_2)_{15}Si(OCH_3)_3$     (32)

$CF_3(CF_2)_5(CH_2)_2Si(CH_3)_2(CH_2)_9Si(OCH_3)_3$     (33)

$CF_3(CF_2)_7(CH_2)_2Si(CH_3)_2(CH_2)_9Si(OCH_3)_3$     (34)

$CF_3COO(CH_2)_{15}Si(OCH_3)_3$     (35)

$CF_3(CF_2)_5(CH_2)_2Si(OCH_3)_3$     (36)

$CF_3CH_2O(CH_2)_{15}Si(OC_2H_5)_3$     (37)

$CF_3(CH_2)_3Si(CH_3)_2(CH_2)_{15}Si(OC_2H_5)_3$     (38)

$CF_3(CF_2)_5(OH_2)_2Si(CH_3)_2(CH_2)_9Si(OC_2H_5)_3$     (39)

$CF_3(CF_2)_7(CH_2)_2Si(CH_3)_2(CH_2)_9Si(OC_2H_5)_3$     (40)

$CF_3COO(CH_2)_{15}Si(OC_2H_5)_3$     (41)

$CF_3(CF_2)_5(CH_2)_2Si(OC_2H_5)_3$     (42)

In addition, in above examples 1 to 3, metal carboxylate, metal carboxylate ester, polymeric metal carboxylate, metal carboxylate chelate, titanic acid ester, and titanic acid ester chelate can be used as silanol condensation catalysts. More specifically, stannous acetate, dibutylstannicdilaurate, dibutylstannicdioctate, dibutylstannicdiacetate, dioctylstannicdilaurate, dioctylstannicdioctate, dioctylstannicdiacetate, dioctanoic acid stannous, lead naphthenate, cobalt naphthenate, ferric 2-ethylhexanoate, dioctylstannum bisoctylthioglycolate, dioctylstannum maleate, polymeric dibutylstannum maleate, polymeric dimethylstannum mercaptopropionate, dibutylstannum bisactyacetate, dioctylstannum bisacetyllaurate, tetrabutyltitanate, tetranonyltitanate, and bis(acetylacetonitrile) di-propyltitanate, were can be used as silanol condensation catalysts.

A solvent for preparing the film coating can include a chemical absorbent selected from an alkoxysilane series or chlorosilane series solvent, nonaqueous organic chlorinate solvent, hydrocarbonate solvent, fluorocarbonate solvent, silicone series solvent, or mixtures thereof. Further, the solvent boiling point is recommended at about 50 to 250° C., in cases where increase of particle concentration by evaporating the solvent without washing process is intended.

Specifically, usable solvents are: nonaqueous petroleum naphtha, solvent naphtha, petroleum ether, petroleum benzene, isoparaffin, n-paraffin, decalin, industrial gasoline, nonane, decane, kero, dimethyl silicone, phenyl silicone, alkyl modified silicone, polyether silicone, and dimethylformamide, for chlorosilane series solvents.

Further, alcoholic solvents such as methanol, ethanol, or propanol, or mixtures thereof can be used in addition to the above solvents, in cases where alkoxysilane series absorbent are used and an organic film is produced by evaporating the solvent.

In addition, chlorofluorocarbon solvents, Fluorinert (3M Co. product), Afluid (Asahi Glass Co. product) are on the market as fluorocarbon solvents. Further, these solvents can be used alone or, when having good solubility in each other, in mixtures of two or more. Furthermore, organic chlorinate solvents such as chloroform may be added.

In contrast, when a ketimine compound, organic acid, aldimine compound, enamine compound, oxazoline compound, or aminoalkylalkoxysilane compound was used instead of the above silanol condensation catalysts, the processing time was shortened to about a half to two thirds under same concentration.

Furthermore, when the silanol condensation catalyst was used in mixture with compounds such as a ketimine compound, organic acid, aldimine compound, enamine compound, oxazoline compound, or aminoalkylalkoxysilane compound (mixing ratio range can be 1:9 to 9:1, however, 1:1 was generally preferable), the processing time was shortened further several fold and the coating film production time was shortened up to a fraction.

For example, by substituting the H3 provided by Japan Epoxy Resin Co. to the silanol catalyst of dibutylstannum oxide while keeping other conditions unchanged, the results were almost the same except the reaction time was shortened to about one hour.

Furthermore, by substituting the mixture of the H3, ketimine compound, provided by Japan Epoxy Resin Co., and dibutylstannum bisacetylacetonate, which is a silanol catalyst, (mixing ratio was 1:1) to the silanol catalyst, while keeping other conditions unchanged, the results were almost the same except the reaction time was shortened to about 20 minutes.

Consequently, as stated above, it was found that a ketimine compound, organic acid, aldimine compound, enamine compound, oxazoline compound, or aminoalkylalkoxysilane compound has higher activity than silanol condensation catalyst.

Furthermore, it was found that using a mixture of the silanol condensation catalyst and any one of a ketimine compound, organic acid, aldimine compound, enamine compound, oxazoline compound, or aminoalkylalkoxysilane compound results in much higher activity.

In addition, the ketimine compound usable here is not limited and others are listed below such as:

2,5,8-triaza-1,8-nonadiene,
3,11-dimethyl-4,7,10-triaza-3,10-tridecadiene,
2,10-dimethyl-3,6,9-triaza-2,9-undecadiene,
2,4,12,14-tetramethyl-5,8,11-triaza-4,11-pentadecadiene,
2,4,15,17-tetramethyl-5,8,11,14-tetraaza-4,14-octadecadiene,
2,4,20,22-tetramethyl-5,12,19-triaza-4,19-trieicosadiene.

In addition, a usable organic acid includes, but not limited to, a formic acid, acetic acid, propionic acid, butylic acid, or malonic acid, and the like, and each one of them nearly had the same effect.

In addition, the above three examples were described with alumina micro particle as example, any kind of micro particle having a surface which contains an active hydrogen such as a hydrogen of a hydroxyl group, an amino group, or an imino group can be used.

Specifically, particles other than alumina, such as silica or zirconia, may be used as a transparent particle that is harder than glass material.

Example 4

A driving test was conducted in rainy weather by loading the water repellent glass plates, which was produced by the same conditions as described in example 1, having a water-droplet contacting degree of about 160 degrees (for practical use, water-droplet contacting degrees of 150 degrees or more provided the same result) to the automobile front paned window (also called windshield; angle of gradient is about 45 degrees), the side paned window (angle of gradient is about 70 degrees), and the rear paned window (angle of gradient is about 30 degrees).

First, the rain droplet adhesion when parking was evaluated, and all paned windows had almost no adhesion of droplet with a diameter of 5 mm or more.

Next, a driving test was conducted under 45 km/hour speed and the rain droplet adhesion on the paned windows was evaluated. The side paned window and the rear paned window had almost no adhesion of droplet with a diameter of about 2 mm or more. In addition, during the driving, a number of rain droplets adhered continuously on the windshield, but the droplets with a diameter of about 2 mm or more moved toward the upper direction quickly, then flew away and did not remain on the windshield to an extent that would interfere with the field of vision. Further, when the driving speed was increased to 60 km/hour, the droplets with a diameter of about 2 mm or more were blown away quickly and almost all of them were removed.

Further, the rearward visibility was evaluated with the door mirror through the side paned window plate during the driving test, and neither the deflection of the rearward visibility, nor the deterioration of the visibility by the rain droplets was found significantly.

In addition, under fine weather conditions, the driving visibility with and without the coating film was evaluated.

As the transparency of the coating film is 97% or more under the light having a wavelength of 400 nm to 700 nm, deterioration of visibility was not found significantly compared to the automobile having no coating film. In addition, the friction resistance against the windshield wiper was significantly improved compared with the water repellent coating film formed on a glass itself because of the hardness of the alumina micro particle.

From the experiments above, it was confirmed that the automobile according to the present invention provides extremely safe conditions for driving under rainy weather.

Figure 3B:
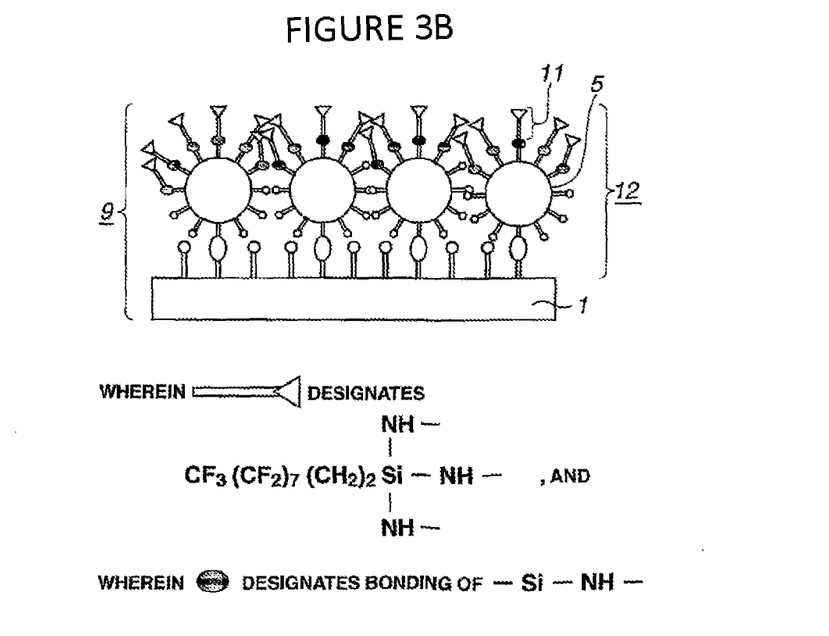
Figure 4:
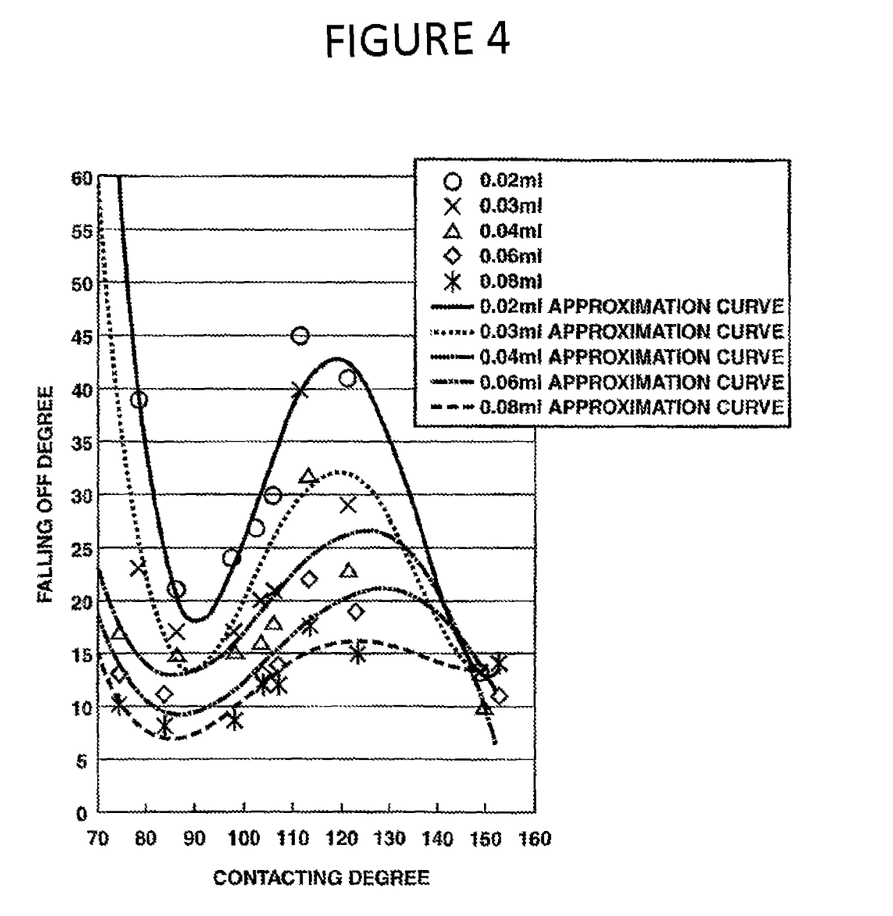
FIG. 4 shows a graph that plots data obtained from the pilot study, and shows the relationship between the water contacting degree and the falling off degree.

The relationship between the water-droplet contacting degree (including additional data obtained by using other materials) and the falling off degree obtained from various experiments was shown FIG. 3. As clearly shown in this data, when the droplet contacting degree is 150 degrees or more, most of the droplets on the paned window run off by themselves.

The invention claimed is:

1. A water repellent glass comprising:
a glass substrate defining a top surface; and
a water repellent transparent micro particle film comprising:
a first chemical absorbent monomolecular film formed over the top surface of the glass substrate from an alkoxysilane compound of the first chemical absorbent monomolecular film, having a first end covalently linked to the glass substrate and having a reactive group of epoxy which is on a second, opposite end of the alkoxysilane compound;
a second chemical absorbent monomolecular film formed on a transparent micro particle, the transparent micro particle being linked to an alkoxysilane compound of the second chemical absorbent monomolecular film, having a first end covalently linked to the transparent micro particle and having a reactive group of amino on a second, opposite end of the alkoxysilane compound of the second chemical absorbent monomolecular film, the transparent micro particle being coupled to the alkoxysilane compound of the first chemical absorbent monomolecular film via a reaction between at least one epoxy reactive group of the alkoxysilane compound of the first chemical absorbent monomolecular film and at least one amino reactive group of the alkoxysilane compound of the second chemical absorbent monomolecular film, wherein the alkoxysilane compound of the second chemical absorbent monomolecular film is different than the alkoxysilane compound of the first chemical absorbent monomolecular film; and
a water repellent monomolecular film formed via a reaction between the alkoxysilane compound of the second chemical absorbent monomolecular film and an alkoxysilane compound or a chlorosilane compound of the water repellent monomolecular film, the alkoxysilane compound or chlorosilane compound of the water repellent monomolecular film having a fluorocarbon moiety and a reactive group capable of reacting with the alkoxysilane compound of the second chemical absorbent monomolecular film such that the alkoxysilane compound or chlorosilane compound of the water repellent monomolecular film is covalently linked to the transparent micro particle on a side of the transparent micro particle positioned distally relative to the top surface of the glass substrate,
wherein the water repellent transparent micro particle film provides the water repellent glass with a water-droplet contact angle of 150 degrees or more and the water repellent transparent micro particle film has a thickness of about 100 nm;
wherein the first chemical absorbent monomolecular film contains the epoxy groups covalently linked to the surface of the glass substrate, from hydroxyl groups as a result of silanol condensation, linking with the glass substrate, and the second chemical absorbent monomolecular film contains the amino groups chemically linked to the surface of the transparent micro particle, from hydroxyl groups as a result of silanol condensation, linking with the transparent microparticle, wherein the first chemical absorbent monomolecular film has a thickness of about 1 nm and the second chemical absorbent monomolecular film has a thickness of about 1 nm.

2. The water repellent glass of claim 1, wherein the transparent micro particle is a micro-particle of silica, alumina, or zirconia.

3. The water repellent glass of claim 1, wherein the glass substrate having the water repellent transparent micro particle film has a transparency of at least about 97%.

4. The water repellent glass of claim 1, wherein the water repellent glass is positioned in a vehicle as a windshield, side window or rear window.

5. The water repellent glass of claim 1, wherein the water repellent glass is positioned as a window in a building.

6. The water repellent glass of claim 1, wherein the size of the transparent micro particle is smaller than visible light wavelength.

7. The water repellent glass of claim 1, wherein the water repellent transparent micro particle film provides the water repellent glass with a water-droplet contact angle of about 160 degrees.

8. The water repellent glass of claim 1, wherein the transparent micro particle is a micro-particle of alumina, silica, or zirconia and the transparent micro particle has a higher hardness than the glass substrate.

9. The water repellent glass of claim 1, wherein the water repellent monomolecular film has critical surface energy of 10 mN/m or less.

10. The water repellent glass of claim 1, wherein the water repellent monomolecular film has critical surface energy of about 6 mN/m.

11. The water repellent glass of claim 1, wherein the transparent micro particle is a micro-particle of alumina and the transparent micro particle has an average diameter of about 100 nm.

12. The water repellent glass of claim 1, wherein the alkoxysilane compound of the first chemical absorbent monomolecular film is selected from the group consisting of:

$(CH_2OCH)CH_2O(CH_2)_7Si(OCH_3)_3$, $(CH_2OCH)CH_2O(CH_2)_{11}Si(OCH_3)_3$, $(CH_2CHOCH(CH_2)_2)CH(CH_2)_2Si(OCH_3)_3$, $(CH_2CHOCH(CH_2)_2)CH(CH_2)_4Si(OCH_3)_3$, $(CH_2CHOCH(CH_2)_2)CH(CH_2)_6Si(OCH_3)_3$, $(CH_2OCH)CH_2O(CH_2)_7Si(OC_2H_5)_3$, $(CH_2OCH)CH_2O(CH_2)_{11}Si$ $(OC_2H_5)_3$, $(CH_2CHOCH(CH_2)_2)CH(CH_2)_2Si(OC_2H_5)_3$, $(CH_2CHOCH(CH_2)_2)CH(CH_2)_4Si(OC_2H_5)_3$, and $(CH_2CHOCH(CH_2)_2)CH(CH_2)_6Si(OC_2H_5)_3$.

13. The water repellent glass of claim 1, wherein the water repellent monomolecular film is formed via a reaction between the alkoxysilane compound of the second chemical absorbent monomolecular film and a chlorosilane compound, the chlorosilane compound being selected from the group consisting of: $CF_3(CF_2)_7(CH_2)_2SiCl_3$, $CF_3CH_2O(CH_2)_{15}SiCl_3$, $CF_3(CH_2)_3Si(CH_3)_2(CH_3)_{15}SiCl_3$, $CF_3(CF_2)_5(CH_2)_2Si(CH_3)_2(CH_2)_9SiCl_3$, $CF_3(CF_2)_7(CH_2)_2Si(CH_3)_2(CH_2)_9SiCl_3$, $CF_3COO(CH_2)_{15}SiCl_3$, $CF_3(CF_2)_5(CH_2)_2SiCl_3$.

14. A water repellent glass comprising:
a glass substrate defining a top surface; and
a water repellent transparent micro particle film comprising:
   a first chemical absorbent monomolecular film formed over the top surface of the glass substrate from an alkoxysilane compound of the first chemical absorbent monomolecular film, having a first end covalently linked to the glass substrate and having a reactive group of epoxy which is on a second, opposite end of the alkoxysilane compound;
   a second chemical absorbent monomolecular film formed on a transparent micro particle, the transparent micro particle being linked to an alkoxysilane compound of the second chemical absorbent monomolecular film, having a first end covalently linked to the transparent micro particle and having a reactive group selected from one of an amino or imino group which is on a second, opposite end of the alkoxysilane compound of the second chemical absorbent monomolecular film, the transparent micro particle being coupled to the alkoxysilane compound of the first chemical absorbent monomolecular film via a reaction between at least one epoxy reactive group of the alkoxysilane compound of the first chemical absorbent monomolecular film and at least one amino or imino reactive group of the alkoxysilane compound of the second chemical absorbent monomolecular film, wherein the alkoxysilane compound of the second chemical absorbent monomolecular film is different than the alkoxysilane compound of the first chemical absorbent monomolecular film; and
   a water repellent monomolecular film formed via a reaction between the alkoxysilane compound of the second chemical absorbent monomolecular film and an alkoxysilane compound or a chlorosilane compound of the water repellent monomolecular film, the alkoxysilane compound or chlorosilane compound of the water repellent monomolecular film having a fluorocarbon moiety and a reactive group capable of reacting with the amino or imino group of the alkoxysilane compound of the second chemical absorbent monomolecular film such that the alkoxysilane compound or chlorosilane compound of the water repellent monomolecular film is covalently linked to the transparent micro particle on a side of the transparent micro particle positioned distally relative to the top surface of the glass substrate;
wherein the water repellent transparent micro particle film provides the water repellent glass with a water-droplet contact angle of 150 degrees or more and the water repellent transparent micro particle film has a thickness of about 100 nm;
wherein the first chemical absorbent monomolecular film with alkoxysilane compound having the epoxy group on the second, opposite end has a thickness of about 1 nm.

15. The water repellent glass of claim 14, wherein:
the glass substrate having one or more active hydrogen groups on the glass substrate;
the alkoxysilane compound of the first chemical absorbent monomolecular film being covalently linked to the substrate through a reaction between the first end of the alkoxysilane compound of the first chemical absorbent monomolecular film and the one or more active hydrogen groups;
the transparent micro particle having one or more active hydrogen groups;
the alkoxysilane compound of the second chemical absorbent monomolecular film being covalently linked to the particle through a reaction between the first end of the alkoxysilane compound of the second chemical absorbent monomolecular film and the active hydrogen groups of the transparent micro particle.

16. A water repellent glass comprising:
a glass substrate defining a top surface; and
a water repellent transparent micro particle film comprising:
   a first chemical absorbent monomolecular film formed over the top surface of the glass substrate from an alkoxysilane compound of the first chemical absorbent monomolecular film, having a first end covalently linked to the glass substrate and having an epoxy reactive group which is on a second, opposite end of the alkoxysilane compound;
   a second chemical absorbent monomolecular film formed on a transparent micro particle, the transparent micro particle being linked to an alkoxysilane compound of the second chemical absorbent monomolecular film, having a first end covalently linked to the transparent micro particle and having an amino reactive group which is on a second, opposite end of the alkoxysilane compound of the second chemical absorbent monomolecular film, the transparent micro particle being coupled to the alkoxysilane compound of the first chemical absorbent monomolecular film via a reaction between the epoxy reactive group of the alkoxysilane compound of the first chemical absorbent monomolecular film and the amino reactive group of the alkoxysilane compound of the second chemical absorbent monomolecular film, wherein the alkoxysilane compound of the second chemical absorbent monomolecular film is different than the alkoxysilane compound of the first chemical absorbent monomolecular film; and
   a water repellent monomolecular film formed via a reaction between the alkoxysilane compound of the second chemical absorbent monomolecular film and an alkoxysilane compound or a chlorosilane compound of the water repellent monomolecular film, the alkoxysilane compound or chlorosilane compound of the water repellent monomolecular film having a fluorocarbon moiety and a reactive group capable of reacting with the amino group of the alkoxysilane compound of the second chemical absorbent monomolecular film such that the alkoxysilane compound or chlorosilane compound of the water repellent monomolecular film is covalently linked to the transparent micro particle on a side of the transparent micro particle positioned distally relative to the top surface of the glass substrate;

wherein the water repellent transparent micro particle film provides the water repellent glass with a water-droplet contact angle of 150 degrees or more and the water repellent transparent micro particle film has a thickness of about 100 nm;

wherein the second chemical absorbent monomolecular film with alkoxysilane compound having the amino reactive group has a thickness of about 1 nm.

17. A water repellent glass comprising:
a glass substrate defining a top surface; and
a water repellent transparent micro particle film comprising:
   a first chemical absorbent monomolecular film formed over the top surface of the glass substrate from an alkoxysilane compound of the first chemical absorbent monomolecular film, having a first end covalently linked to the glass substrate and having a reactive group that is an amino group which is on a second, opposite end of the alkoxysilane compound;
   a second chemical absorbent monomolecular film formed on a transparent micro particle, the transparent micro particle being linked to an alkoxysilane compound of the second chemical absorbent monomolecular film, having a first end covalently linked to the transparent micro particle and having a reactive group that is an epoxy group which is on a second, opposite end of the alkoxysilane compound of the second chemical absorbent monomolecular film, the transparent micro particle being coupled to the alkoxysilane compound of the first chemical absorbent monomolecular film via a reaction between at least one amino reactive group of the alkoxysilane compound of the first chemical absorbent monomolecular film and at least one epoxy reactive group of the alkoxysilane compound of the second chemical absorbent monomolecular film, wherein the alkoxysilane compound of the second chemical absorbent monomolecular film is different than the alkoxysilane compound of the first chemical absorbent monomolecular film; and
   a water repellent monomolecular film formed via a reaction between the alkoxysilane compound of the second chemical absorbent monomolecular film and an alkoxysilane compound or a chlorosilane compound of the water repellent monomolecular film, the alkoxysilane compound or chlorosilane compound of the water repellent monomolecular film having a fluorocarbon moiety and a reactive group capable of reacting with the epoxy group of the alkoxysilane compound of the second chemical absorbent monomolecular film such that the alkoxysilane compound or chlorosilane compound of the water repellent monomolecular film is covalently linked to the transparent micro particle on a side of the transparent micro particle positioned distally relative to the top surface of the glass substrate, wherein the water repellent transparent micro particle film provides the water repellent glass with a water-droplet contact angle of 150 degrees or more and the water repellent transparent micro particle film has a thickness of about 100 nm;

wherein the first chemical absorbent monomolecular film contains amino groups covalently linked to the surface of the glass substrate, from hydroxyl groups as a result of silanol condensation, linking with the glass substrate, and the second chemical absorbent monomolecular film contains epoxy groups chemically linked to the surface of the transparent micro particle, from hydroxyl groups as a result of silanol condensation, linking with the transparent microparticle, wherein the first chemical absorbent monomolecular film has a thickness of about 1 nm and the second chemical absorbent monomolecular film has a thickness of about 1 nm.

18. The water repellent glass of claim 17, wherein the alkoxysilane compound of the first chemical absorbent monomolecular film is selected from the group consisting of:

$H_2N(CH_2)_5Si(OCH_3)_3$, $H_2N(CH_2)_7Si(OCH_3)_3$, $H_2N(CH_2)_9Si(OCH_3)_3$, $H_2N(CH_2)_5Si(OC_2H_5)_3$, $H_2N(CH_2)_7Si(OC_2H_5)_3$, $H_2N(CH_2)_9Si(OC_2H_5)_3$.

19. A water repellent glass comprising:
a glass substrate defining a top surface; and
a water repellent transparent micro particle film comprising:
   a first chemical absorbent monomolecular film formed over the top surface of the glass substrate from an alkoxysilane compound of the first chemical absorbent monomolecular film, having a first end covalently linked to the glass substrate and having a reactive group selected from one of an epoxy group or an amino or imino group on a second, opposite end of the alkoxysilane compound;
   a second chemical absorbent monomolecular film formed on a transparent micro particle, the transparent micro particle being linked to an alkoxysilane compound of the second chemical absorbent monomolecular film, having a first end covalently linked to the transparent micro particle and having a reactive group selected from one of an epoxy group or an amino or imino group on a second, opposite end of the alkoxysilane compound of the second chemical absorbent monomolecular film, the transparent micro particle being coupled to the alkoxysilane compound of the first chemical absorbent monomolecular film via a reaction between at least one reactive group of the alkoxysilane compound of the first chemical absorbent monomolecular film and at least one reactive group of the alkoxysilane compound of the second chemical absorbent monomolecular film, wherein the alkoxysilane compound of the second chemical absorbent monomolecular film is different than the alkoxysilane compound of the first chemical absorbent monomolecular film;
   wherein if the reactive group of the first chemical absorbent monomolecular film is an epoxy group then the reactive group of the second chemical absorbent monomolecular film is an amino or imino group, and if the reactive group of the first chemical absorbent monomolecular film is an amino or imino group then the reactive group of the second chemical absorbent monomolecular film is an epoxy group; and a water repellent monomolecular film formed via a reaction between the alkoxysilane compound of the second chemical absorbent monomolecular film and an alkoxysilane compound or a chlorosilane compound of the water repellent monomolecular film, the alkoxysilane compound or chlorosilane compound of the water repellent monomolecular film having a fluorocarbon moiety and a reactive group capable of reacting with the alkoxysilane compound of the second chemical absorbent monomolecular film such that the alkoxysilane compound or chlorosilane compound of the water repellent monomolecular film is covalently linked to the transparent micro particle on a side of the transparent micro particle positioned distally relative to the top surface of the glass substrate, wherein the first chemical absorbent monomolecular film has a thickness of about 1 nm, with the reactive group of the alkoxysilane of that film as the epoxy group and the second chemical absorbent monomolecular film has a thickness of about 1 nm with the reactive group of the alkoxysilane of that film as the epoxy group, and wherein the water repellent transparent micro particle film provides the water repellent glass with a water-droplet contact angle of 150 degrees or more and the water repellent transparent micro particle film has a thickness of about 100 nm.

* * * * *

UNITED STATES PATENT AND TRADEMARK OFFICE
CERTIFICATE OF CORRECTION

PATENT NO. : 9,447,284 B2
APPLICATION NO. : 12/598288
DATED : September 20, 2016
INVENTOR(S) : Ogawa It is certified that error appears in the above-identified patent and that said Letters Patent is hereby corrected as shown below:

In the Specification

In Column 1, Line 7, delete "§371" and insert -- § 371 --, therefor.

In Column 8, Lines 1-2, delete "$(CH_2CHOCH(CH_2)_2)CH(CH_2)_6Si(OC_2H_5)_3$ (11)

$H_2N(CH_2)_5Si(OCH_3)_3$ (12)" and insert -- $(CH_2CHOCH(CH_2)_2)CH(CH_2)_6Si(OC_2H_5)_3$ (10)

$H_2N(CH_2)_5Si(OCH_3)_3$ (11) --, therefor.

In Column 8, Line 34, delete "$OF_3(OH_2)_3Si(OH_3)_2(OH_3)_{15}SiCl_3$" and insert -- $CF_3(CH_2)_3Si(CH_3)_2(CH_3)_{15}SiCl_3$ --, therefor.

In Column 8, Line 61, delete "$CF_3(CF_2)_5(OH_2)_2Si(CH_3)_2(CH_2)_9Si(OC_2H_5)_3$" and insert -- $CF_3(CF_2)_5(CH_2)_2Si(CH_3)_2(CH_2)_9Si(OC_2H_5)_3$ --, therefor.

Signed and Sealed this
Fourteenth Day of March, 2017

Michelle K. Lee
*Director of the United States Patent and Trademark Office*